M. H. CAMPION.
Sprinkler.
No. 218,366. Patented Aug. 12, 1879.
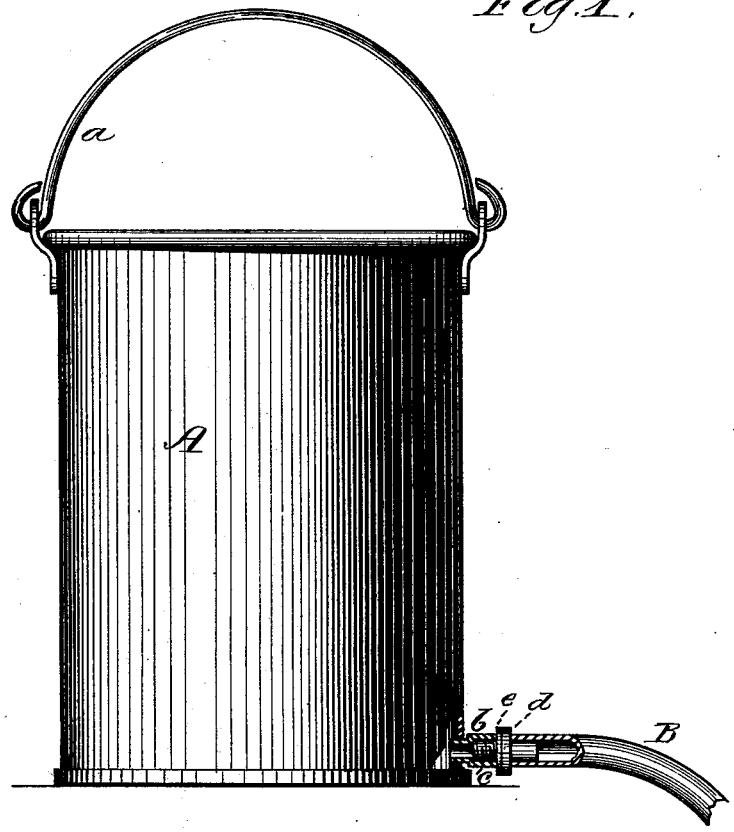
Fig. 1.
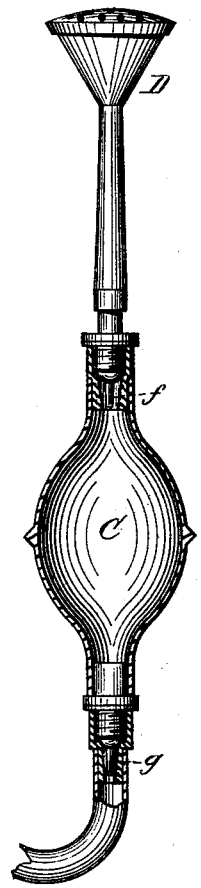
Fig. 2.
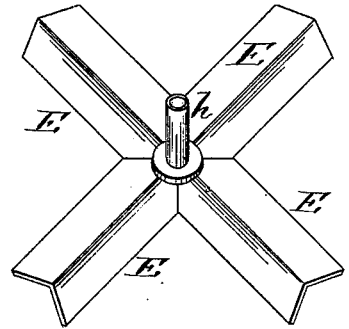
WITNESSES
Nat. E. Oliphant
Geo. B. Porter
INVENTOR
Michael H. Campion
per
Chas. H. Fowler
Attorney.

UNITED STATES PATENT OFFICE.

MICHAEL H. CAMPION, OF OWEGO, NEW YORK.

IMPROVEMENT IN SPRINKLERS.

Specification forming part of Letters Patent No. 218,366, dated August 12, 1879; application filed June 30, 1879.

*To all whom it may concern:*

Be it known that I, MICHAEL H. CAMPION, of Owego, in the county of Tioga and State of New York, have invented a new and valuable Improvement in Sprinklers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my invention, and Fig. 2 is a perspective view of the dasher or stirrer.

The present invention has relation to that class of portable devices used to irrigate or sprinkle garden or house plants, also for distributing paris-green or other poisonous powder on potato-vines and other plants; and has for its object to construct the device whereby the spray of liquid can be controlled by the operator, and by the weight of the water or liquid, together with the compression of the rubber or elastic bulb, the liquid will be forced through a rose-head with sufficient power to direct the spray or jets of water to the point required, as will be hereinafter described, and subsequently pointed out in the claims.

In the accompanying drawings, A represents a pail of any suitable size and shape, provided with a bail, *a*. To the side of the pail A, and near the bottom thereof, is secured a screw-sleeve, *b*, communicating with the interior of the pail. To the sleeve *b* is connected a screw-nipple, *c*, formed with an annular flange, *d*, and a packing-ring, *e*, is interposed between the flange and edge of the sleeve, to form a tight joint at that point.

To the nipple *c* is secured a rubber tube, B, said tube having detachably connected to one of its ends an elastic bulb, C, provided with valves *f g* at its opposite ends, and operating upon the same principle as those in the ordinary bulb-syringe.

The bulb C is provided with a sprinkler or rose, D, and, if desired, may be removable, and rose-heads or sprinklers of different sizes may be substituted, as may be found necessary when dry powder is used.

It will be noticed that when the pail is filled with water the discharge-tube B, connecting with the interior of the pail near the bottom, by the compressing and expanding of the bulb C, the weight of water in the pail will cause the spray to be ejected from the rose or sprinkler with considerable force, sufficient to conduct it to any portion of a bush or plant without the necessity of the operator changing his position, as the force of the spray, in addition to the elasticity of the tube B, will insure perfect control of the water or liquid to any portion of the plant needed.

Although my invention is especially designed to be used with liquid for garden and house plants, it may be employed for distributing paris-green or other poisonous powder; and when used for this purpose I disconnect the tube B from the sleeve *b*, and close the opening in the sleeve by a cap or suitable stopper.

The end of the tube B is connected to a tube, *h*, of a stirrer or dasher placed in the bottom of the pail. This stirrer or dasher consists of a suitable number of wings, E, concave upon their under side, so that when lying flat upon the powder or bottom of the pail, the powder will be drawn by suction along the concavity of the wings E into the tube *h*, and is forced from the rose or sprinkler D in the same manner as the liquid.

The employment of the stirrer or dasher enables the powder to be kept well mixed, as, when paris-green is used, it frequently settles to the bottom, and, by the occasional twist or shaking of the dasher or stirrer, it keeps the paris-green well mixed with the other ingredients used.

Having now fully described my invention, what I claim as new, and desire to secure by Letters Patent, is—

1. The combination, with the pail A, of the rubber tube B, detachably connected to the pail near its bottom, said tube being provided with the bulb C and valves *f g*, and the rose or sprinkler D, as and for the purpose set forth.

2. The pail A, with screw-sleeve *b* secured to the pail near its bottom, in combination with the screw-nipple *c*, flange *d*, and packing *e*, and the detachable tube B, bulb C, and rose or sprinkler D, substantially as and for the purpose specified.

In testimony that I claim the above I have hereunto subscribed my name in the presence of two witnesses.

MICHAEL H. CAMPION.

Witnesses:
 B. C. SPRINGSTENE,
 L. W. TRUESDELL.